United States Patent [19]

Sims, Jr.

[11] Patent Number: 4,882,821

[45] Date of Patent: Nov. 28, 1989

[54] MAGNETIC CASKET SEAL ASSEMBLY

[75] Inventor: John W. Sims, Jr., San Antonio, Tex.

[73] Assignee: Magna-Seal, Inc., San Antonio, Tex.

[21] Appl. No.: 195,148

[22] Filed: May 18, 1988

[51] Int. Cl.[4] .............................................. A01N 1/00

[52] U.S. Cl. .............................................. 27/17; 27/2; 49/478; 220/344

[58] Field of Search .......................... 27/2, 3, 6, 14, 16, 27/17; 277/80; 403/DIG. 1; 49/478; 220/344, 357, 358

[56] References Cited

U.S. PATENT DOCUMENTS

| | | | |
|---|---|---|---|
| 717,391 | 12/1902 | Grocott | 27/17 |
| 2,533,827 | 12/1950 | McEwan | 27/17 |
| 2,811,768 | 11/1957 | Axelson | 27/17 |
| 3,065,517 | 11/1962 | Dower | 27/17 |
| 3,078,134 | 2/1963 | Hayes, Jr. | 312/296 |
| 3,138,833 | 6/1964 | Neuman | 49/478 |
| 3,201,833 | 8/1965 | Bryon et al. | 49/478 |
| 3,242,537 | 3/1966 | Monti | 49/478 |
| 3,327,429 | 6/1967 | Slaughter | 27/17 |
| 3,735,456 | 5/1973 | Cude | 27/17 |
| 3,838,482 | 10/1974 | Wallace | 27/11 |
| 3,892,417 | 7/1975 | Clayton | 27/2 X |
| 4,240,228 | 12/1980 | Okamura | 49/478 |

*Primary Examiner*—Robert A. Hafer
*Assistant Examiner*—Sam Rimell
*Attorney, Agent, or Firm*—Fleit, Jacobson, Cohn, Price, Holman & Stern

[57] ABSTRACT

A casket is provided including a one-piece upwardly opening tub or base and a pair of hingedly supported head and foot end covers. The head and foot end covers include horizontally opposing marginal portions extending between opposite sides of the tub, the tub upper marginal edge includes an inner peripheral portion having a peripherally continuous seal structure supported therefrom and an outer peripheral portion having a substantially peripherally continuous magnet structure supported therefrom. The marginal portions of the cover overlying the marginal portions of the tub are constructed of ferrous material for magnetic attraction to the magnetic material supported from the tub and the horizontally opposing marginal portions of the head and foot covers include coacting seal structure for forming a fluid tight seal therebetween when the covers are in the closed positions.

9 Claims, 2 Drawing Sheets

MAGNETIC CASKET SEAL ASSEMBLY

BACKGROUND OF THE INVENTION

1. Field of the Invention

A casket is provided including a one-piece base or tub and a pair of head and foot end covers swingable about horizontal axes between open upstanding positions and closed horizontal positions overlying and closing the base or tub from above. Coacting first seal structure is disposed between the base and covers for forming a fluid tight seal between the upper peripheral margin of the base and the covers when the latter are closed and the covers include horizontally opposing marginal portions extending across the tub and equipped with second coacting seal structure for forming a fluid tight seal therebetween and with the first seal structure when the covers are in the closed positions. Further, the base and covers include coacting magnetic means for yieldably magnetically retaining the covers in the closed positions.

2. Description of Related Art

Various different forms of open sided containers having swingable closures therefor heretofore have been provided with seal structures for forming a fluid tight seal between the open sides of the containers and the closure covers therefor when the latter are in the closed positions. In addition, some of these previously known forms of containers also have included magnetic means for yieldingly magnetically retaining the associated covers in the closed positions.

Examples of these previously known forms of containers are disclosed in U.S. Pat. Nos. 2,811,768, 3,065,517, 3,078,134, 3,327,429, 3,735,456 and 3,838,482. However, these previously known devices do not include the overall combination of structural features of the instant invention.

SUMMARY OF THE INVENTION

The casket of the instant invention incorporates a one-piece upwardly opening tub and a pair of head and foot end covers hingedly supported from the tub for movement between upstanding open positions and horizontal closed positions overlying the head and foot ends of the tub and closing the latter from above. The upper peripheral surface of the tub and the opposing surfaces of the closed covers include coacting seal structure forming a fluid tight seal between the covers and the peripheral upper surface of the tub and the covers include horizontally opposing marginal portions extending across the tub between which second seal structure is provided for forming a fluid tight seal between these opposing marginal portions, the second seal structure also establishing a fluid tight seal with the tub upper peripheral margin seal structure. Also, the covers are constructed of ferrous material and the outer portion of the upper periphery of the tub includes magnetic means supported therefrom for magnetically securing the covers in closed positions.

It is further pointed out that the upper peripheral seal structure of the tub is constructed in a manner whereby two peripherally extending seal zones are formed about the casket when the covers are in the closed position.

The main object of this invention is to provide an improved seal assembly for a casket including hingedly supported head and foot covers and wherein a fluid tight seal is formed between both the covers and between the covers and the tub of the casket when the covers are in their closed positions.

Another object of this invention is to provide a casket assembly in accordance with the preceding object and including magnetic means for magnetically retaining the covers in closed positions.

Still another important object of this invention is to provide a seal assembly for a dual cover casket constructed in a manner whereby a pair of inner and outer peripheral seal zones will be established between the upper periphery of the tub of the casket and the two covers of the casket when the covers are in the closed positions.

Yet another object of this invention is to provide a seal assembly which may be readily added to existing caskets and even caskets originally constructed to have only a single full-length cover section thereof by first cutting the single cover section into head and foot cover sections and thereafter applying the necessary seal structure thereto.

A final object of this invention to be specifically enumerated herein is to provide a casket seal assembly in accordance with the preceding objects and which will conform to conventional forms of manufacture, be of simple construction and easy to install so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
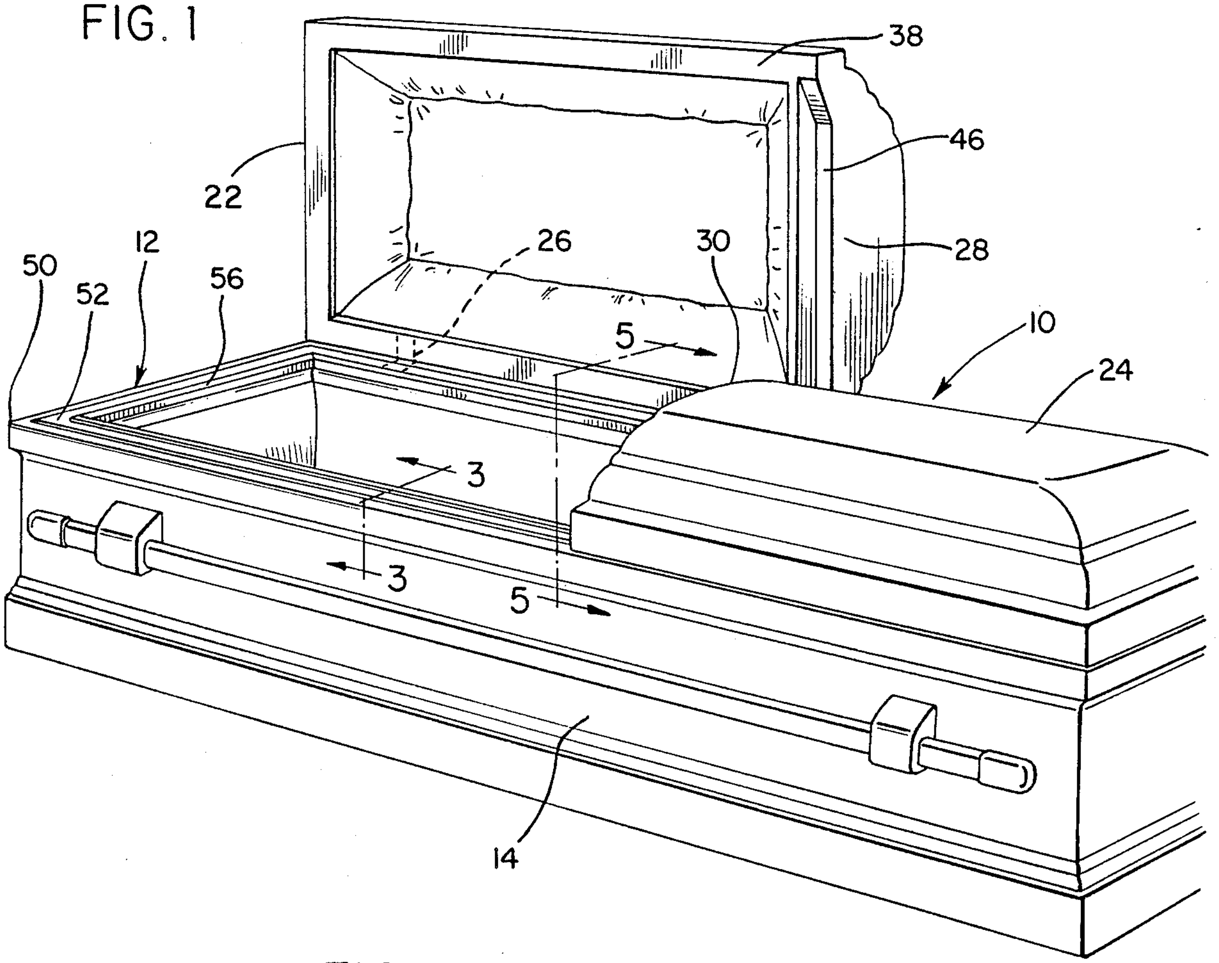
FIG. 1 is a perspective view of a casket constructed in accordance with the present invention and with the head and cover thereof in an open position.
Figure 2:
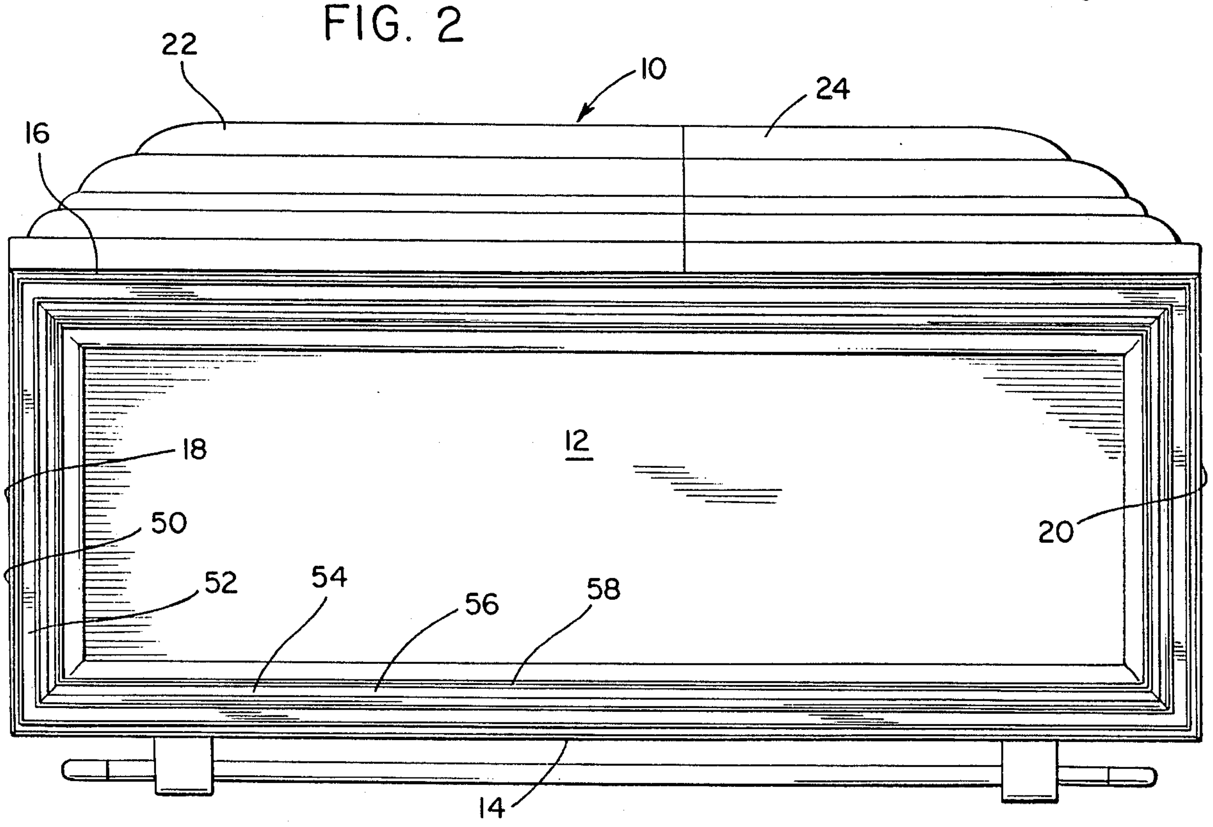
FIG. 2 is a top plan view of the casket with both the head and foot end covers in their open positions.
Figure 3:
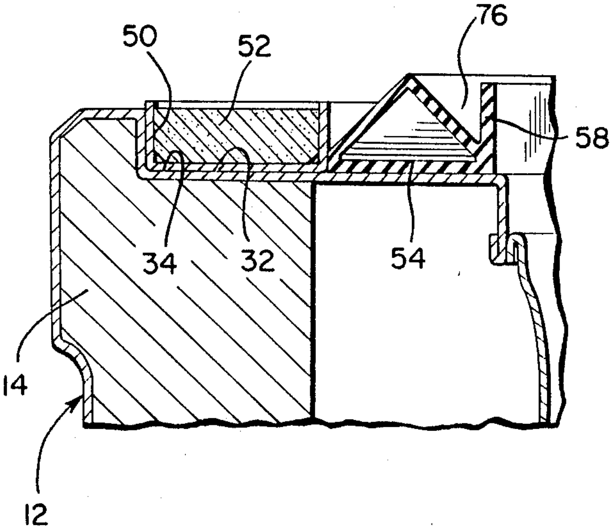
FIG. 3 is an enlarged fragmentary vertical sectional view taken substantially upon the plane indicated by the section line 3—3 of FIG. 1.

Referring now more specifically to the drawings, the numeral 10 generally designates a casket constructed in accordance with the present invention. The casket 10 includes a base or tub referred to in general by the reference numeral 12 including opposite walls 14 and 16 and opposite end walls 18 and 20. In addition, the casket 10 includes a head end cover 22 and a foot end cover 24. The covers 22 and 24 each are pivotally supported from the tub 12 through the utilization of longitudinally spaced hinges 26 and the covers 22 and 24 include horizontally opposing marginal portions 28 and 30 extending between the opposite side walls 14 and 16.

Figure 4:
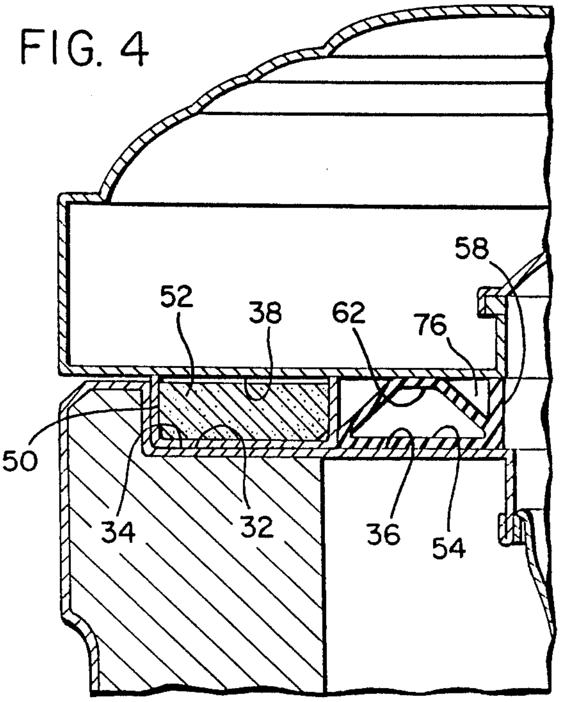
FIG. 4 is a fragmentary enlarged vertical sectional view similar to FIG. 3 but with the head end cover in a closed position.
Figure 6:
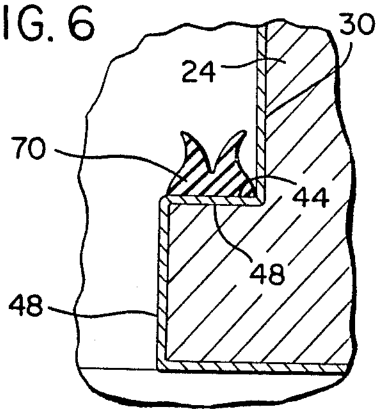
FIG. 6 is a enlarged fragmentary vertical sectional view taken substantially upon the plane indicted by the section line 6—6 of FIG. 5.
Figure 7:
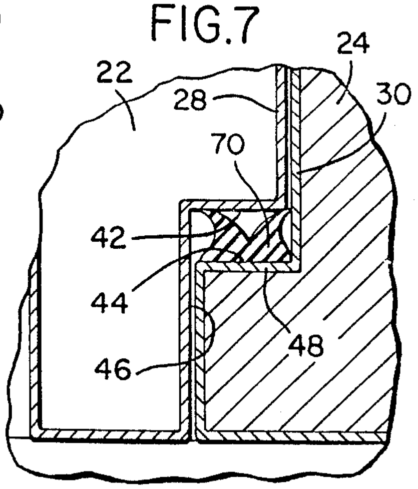
FIG. 7 is an enlarged fragmentary vertical sectional view similar to FIG. 6 but with the head end cover of the casket in a closed position.

The upper marginal portions of the walls 14, 18 and 20 define a peripherally continuous first upwardly facing sealing surface 32 extending about the tub 12 and the sealing surface 32 includes an outer peripheral portion 34 and an inner peripheral portion 36, see FIG. 4. In addition, the covers 22 and 24 include downwardly facing sealing surfaces 38 and 40 which closely oppose the sealing surface 32 when the covers 22 and 24 are in the closed positions and the marginal portions 28 and 30 define sealing surfaces 42 and 44 extending therealong and which oppose each other when the covers 22 and 24 are in the closed positions, see FIG. 7. The sealing surface 42 is defined at the upward extremity of a downwardly opening recess 46 extending along the marginal portion 28 and the sealing surface 44 is defined by the upper extremity of a horizontally laterally offset elongated seal structure 48 supported from and extending along the marginal portion 30 and receivable within the recess 46, see FIGS. 6 and 7.

The outer marginal portion 34 includes a peripherally continuous upwardly opening metal channel 50 suitably secured thereto and extending thereabout and a rubberized magnetic body 52 is secured within the channel 50 in any convenient manner and terminates upwardly a spaced distance below the upper extremities of the channel 50. The sealing surface 38 is constructed of ferrous material and is thus magnetically attracted to the magnet 52.

A resilient and deformable seal strip 54 is secured to and extends along the inner peripheral portion 36 of the seal surface 32 and includes a hollow triangular outer portion 56 and an inner upstanding flange or curb portion 58. The triangular portion 56 projects slightly above the level of the upper extremity of the flange or curb portion 58 and the latter extends slightly above the level of the channel 50 so that when the covers 22 and 24 are closed the triangular portion 56 and the curb portion 58 are downwardly compressed. When the triangular portion 56 is downwardly compressed the upper apex portion 60 thereof (see FIG. 5) is horizontally flattened as at 62, see FIG. 4, and when the curb portion 58 is downwardly compressed, it is merely slightly vertically compressed.

The seal structure 48 includes a horizontal longitudinal mid-portion 66 and oppositely and downwardly inclined opposite end portions 68, the upper extremity of the recess of groove 46 being similarly formed. In addition, the seal structure 48 includes a compressively resilient seal strip 70 extending therealong which may be compressed between the surfaces 42 and 44 the opposite ends lengthwise of the seal strip 70 overlapping adjacent ends of sealant strips 72 extending along and secured to the opposite ends of the seal surface 44 and including downwardly directed triangular terminal ends 74 on their remote ends interlockingly engaged in the corresponding portions of the upwardly opening channel 76 defined between the curb portion 58 and the adjacent inclined side 78 of the triangular portion 56 of the seal strip 54.

Figure 5:
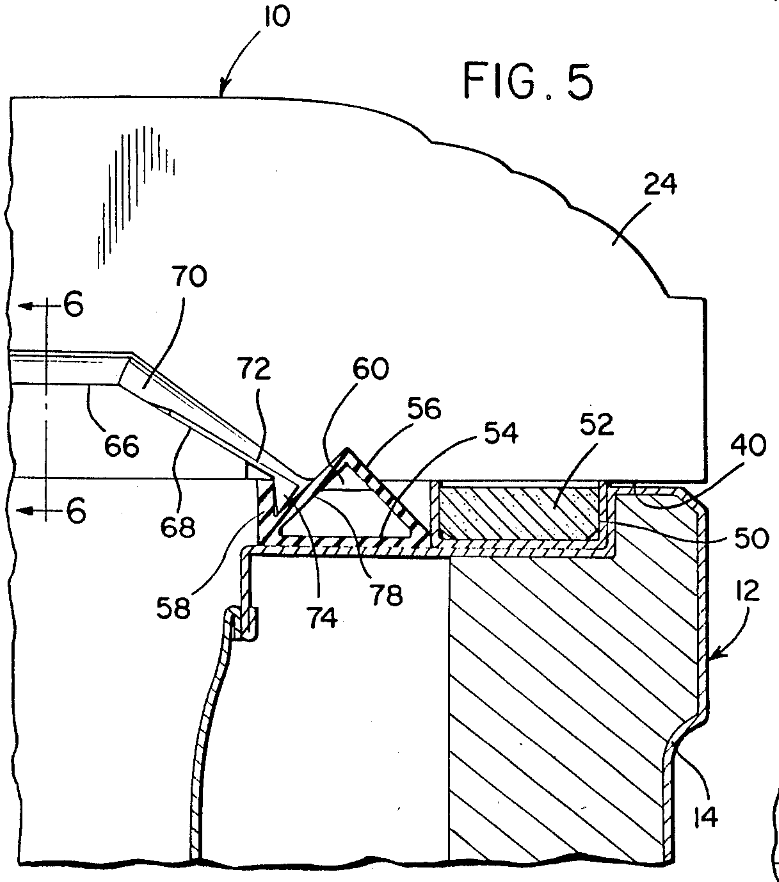
FIG. 5 is an enlarged fragmentary vertical sectional view taken substantially upon the plane indicated by the section line 5—5 of FIG. 1.

The sealant strips 72 serve to form a fluid tight seal between the opposite ends of the seal strip 70 and the adjacent portions of the seal strip 54 in the manner illustrated in FIG. 5.

Of course, the foot end cover 24 must be first closed before the head end cover 22 is closed, or the two covers may be simultaneously closed. Furthermore, the head end cover 22 must be first opened, or the covers 22 and 24 must be simultaneously opened.

If the casket 10 is originally constructed with only a single one-piece cover, that cover is transversely cut in order to form the required head and foot end covers 22 and 24 and the necessary end wall structures are provided and secured in place to endwise close the adjacent ends of the two cover sections and to provide the interfitting recess or groove 46 and seal structure 48 extending along the adjacent marginal portions 28 and 30 of the covers 22 and 24. However, no modification to the tub 12 is required other than to add the channel 50 and body 52 thereto as well as the seal strip 54. Further, the channel 50 and strip 54 may be secured in place through the use of double sided adhesive tape, not shown.

Furthermore, if the casket 10 already includes the head and foot end covers 22 and 24, it is not necessary to modify the head end cover to include the recess or groove 46 since this structure is standard to substantially all such caskets. Therefore, it is merely necessary to provide the structure shown in FIG. 6 of the foot end cover 24 in addition to providing the seal strip 70, the sealant strips 72 and the seal strip 54 together with the channel 50 and body 52.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A casket incorporating a horizontally elongated, upwardly opening base having upstanding opposite side and end walls terminating upwardly in a first peripherally continuous and upwardly facing surface including inner and outer marginal areas, a cover assembly for said base incorporating a pair of opposite head and foot end cover sections pivotally supported from said base for independent swinging movement relative thereto between open upwardly projecting positions and closed horizontal positions overlying said base and closing the latter from above, said cover sections, when in said closed positions, including second downwardly facing peripheral surfaces closely overlying and extending along said first surface and closely horizontally opposing marginal portions extending across said base between corresponding opposite side portions of said first surface, said first and second surfaces including first seal means disposed therebetween and extending thereabout operative to form a fluid tight seal between said first and second peripheral surfaces when said covers are in said closed positions, said opposing marginal portions including third vertically opposing seal surfaces extending therealong and second seal means disposed therebetween operative to form a fluid tight seal between said third surfaces when said covers are in said closed positions and also coacting with said first seal means to form a fluid tight seal therewith at the opposite ends of said third seal surfaces when said covers are in said closed positions, said first seal means extending along the inner marginal area of said first surface, said outer marginal area of said first surface including at least substantially peripherally continuous upwardly facing magnet means supported therefrom, said second downwardly facing peripheral surfaces being constructed of ferrous material for magnetic attraction thereof to said magnet means, said first seal means including inner and outer peripheral portions, one of said peripheral portions being defined by a hollow triangular resilient sealing strip portion including a horizontal base and an uppermost apex portion and the other peripheral portion is defined by an upstanding curb portion formed integrally with one end of said base portion, said apex portion projecting upwardly to an elevation spaced slightly above the uppermost extremity of said curb portion.

2. The casket of claim 1 wherein one of said opposing marginal portions defines a downwardly facing sealing surface extending therealong and the other of said opposing marginal portions includes a laterally outwardly offset and upwardly projecting elongated seal structure extending along and sealingly engaged with said sealing surface when said cover sections are closed.

3. The casket of claim 2 wherein said elongated seal structure includes elongated yieldingly compressible sealant strip means extending therealong sealingly engaged with said first seal means at the ends of said opposing marginal portions.

4. The casket of claim 1 wherein said one peripheral portion comprises said inner peripheral portion and said other peripheral portion comprises said outer peripheral portion.

5. The casket of claim 4 wherein said curb portion and the adjacent portion of said triangular portion define an upwardly opening channel, the opposite ends of said opposite end portions of said elongated seal structure being interlockingly engaged in said channel.

6. The casket of claim 5 wherein one of said opposing marginal portions defines a downwardly facing sealing surface extending therealong and the other of said opposing marginal portions includes a laterally outwardly offset and upwardly projecting elongated seal structure extending along and sealingly engaged with said sealing surface when said cover sections are closed.

7. A casket incorporating a horizontally elongated, upwardly opening base having upstanding opposite side and end walls terminating upwardly in a first peripherally continuous and upwardly facing surface including inner and outer marginal areas, cover means for said base including downwardly facing peripherally extending surface means for opposing said upwardly facing surface, means pivotally supporting said cover means from said base for swinging movement of said cover means relative to said base between an open upwardly projecting position and a closed horizontal position overlying said base with said surface means closely opposing said upwardly facing surface, seal means extending along said upwardly facing surface and with which said surface means are sealingly engaged when said cover means is in the closed position, said seal means including inner and outer peripheral portions, one of said peripheral portions being defined by a hollow triangular resilient sealing strip portion including a horizontal base and an uppermost apex portion and the other peripheral portion of said seal means is defined by an upstanding curb portion formed integrally with one end of said base portion, said apex portion projecting upwardly to an elevation spaced slightly above the uppermost extremity of said curb portion when said cover means is in the open position.

8. The casket of claim 7 wherein said one peripheral portion comprises said inner peripheral portion and said other peripheral portion comprises said outer peripheral portion.

9. A casket incorporating a horizontally elongated, upwardly opening base having upstanding opposite side and end walls terminating upwardly in a first peripherally continuous and upwardly facing surface, cover means for said base including downwardly facing peripherally extending surface means for opposing said upwardly facing surface, pivot means supporting said cover means from said base for swinging movement of said cover means relative to said base between an open upwardly projecting position and a closed horizontal position overlying said base with said surface means closely opposing said upwardly facing surface, seal means extending substantially continuously along said upwardly facing surface and with which said surface means are sealingly engaged when said cover means is in the closed position, said seal means including inner and outer peripheral portions, one of said peripheral portions being defined by a hollow triangular resilient sealing strip portion including a horizontal base and an uppermost apex portion and the other peripheral portion of said seal means is defined by a resilient upstanding curb portion formed integrally with one end of said base portion and defining an upwardly opening channel between said curb portion and the adjacent inclined side of said triangular resilient sealing strip portion, said cover means is in the open position, said uppermost apex and upstanding curb portions when said cover means is in the closed position, being engaged by and partially downwardly flattened and compressed, respectively, by said surface means, said surface and surface means including coacting magnetic means operative to magnetically attract said cover means toward said closed position and defining a predetermined limit of movement of said cover means to said closed position.

* * * * *